(12) United States Patent
Vijapur et al.

(10) Patent No.: US 11,734,069 B2
(45) Date of Patent: *Aug. 22, 2023

(54) SYSTEMS AND METHODS FOR MAINTAINING POOLED TIME-DEPENDENT RESOURCES IN A MULTILATERAL DISTRIBUTED REGISTER

(71) Applicant: BANK OF AMERICA CORPORATION, Charlotte, NC (US)

(72) Inventors: Vinod Vijapur, Sengkang (SG); Brandon Matthew Castagna, Mount Holly, NC (US); Rajesh Mulani, Singapore (SG); Anand Ramachandra Nayak, Singapore (SG)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,183

(22) Filed: Oct. 28, 2022

(65) Prior Publication Data

US 2023/0056259 A1    Feb. 23, 2023

Related U.S. Application Data

(63) Continuation of application No. 16/876,429, filed on May 18, 2020, now Pat. No. 11,561,832.

(51) Int. Cl.
*G06F 9/50* (2006.01)
*G06F 9/30* (2018.01)

(52) U.S. Cl.
CPC ........ *G06F 9/5011* (2013.01); *G06F 9/30105* (2013.01)

(58) Field of Classification Search
CPC ........................... G06F 9/5011; G06F 9/30105
USPC ......................................................... 718/104
See application file for complete search history.

(56) References Cited

U.S. PATENT DOCUMENTS

| | | |
|---|---|---|
| 8,255,297 B2 | 8/2012 | Morgenstern et al. |
| 9,485,323 B1 | 11/2016 | Stickle et al. |
| 9,892,460 B1 | 2/2018 | Winklevoss et al. |
| 10,121,143 B1 | 11/2018 | Madisetti et al. |
| 10,452,776 B2 | 10/2019 | Anderson et al. |
| 10,467,603 B2 | 11/2019 | Liu et al. |

(Continued)

*Primary Examiner* — Gabriel I Garcia
(74) *Attorney, Agent, or Firm* — Moore & Van Allen PLLC; Nicholas C. Russell

(57) ABSTRACT

The present disclosure is directed to a novel system for using a distributed register to generate, manage, and store data for interest-pooled time deposit resource accounts. The invention leverages a pooled resource account approach, allowing for multiple disparate resource accounts to benefit from an enhanced interest return by pooling resource accounts. The system components of the invention contemplate the use of distributed register technology to provide a verified ledger of information related to one or more resource accounts, as well as store system data, user data, and metadata related to the movement and management of resources. By using a distributed register approach to store and verify data related to time-dependent resource account services, the invention provides an automated system and methods for enhancing the flow of sensitive verified information, reducing the need for manual review and increasing the speed at which various resource account services can be validated and executed.

20 Claims, 6 Drawing Sheets

(56) References Cited

U.S. PATENT DOCUMENTS

| | | |
|---|---|---|
| 10,529,042 B2 | 1/2020 | Brown et al. |
| 10,650,376 B1 | 5/2020 | Winklevoss et al. |
| 11,561,832 B2 * | 1/2023 | Vijapur ............... G06F 9/30105 |
| 2010/0228674 A1 | 9/2010 | Ogg et al. |
| 2015/0089034 A1 | 3/2015 | Stickle et al. |
| 2015/0170112 A1 | 6/2015 | Decastro |
| 2016/0321752 A1 | 11/2016 | Tabacco et al. |
| 2017/0085555 A1 | 3/2017 | Bisikalo et al. |
| 2017/0091756 A1 | 3/2017 | Stern et al. |
| 2017/0109735 A1 | 4/2017 | Sheng et al. |
| 2017/0178237 A1 | 6/2017 | Wong |
| 2017/0344988 A1 | 11/2017 | Cusden et al. |
| 2018/0191503 A1 | 7/2018 | Alwar et al. |
| 2018/0218176 A1 | 8/2018 | Voorhees et al. |
| 2019/0080392 A1 | 3/2019 | Youb et al. |
| 2019/0139136 A1 | 5/2019 | Molinari et al. |
| 2019/0147532 A1 | 5/2019 | Singh et al. |
| 2019/0340685 A1 | 11/2019 | Wade et al. |
| 2020/0119933 A1 | 4/2020 | Toll et al. |
| 2020/0374343 A1 * | 11/2020 | Novotny ............. G06F 16/9024 |
| 2022/0107937 A1 | 4/2022 | Adivi et al. |

\* cited by examiner

SYSTEMS AND METHODS FOR MAINTAINING POOLED TIME-DEPENDENT RESOURCES IN A MULTILATERAL DISTRIBUTED REGISTER

CROSS-REFERENCE TO RELATED APPLICATION

The present application is a continuation of co-pending U.S. patent application Ser. No. 16/876,429, of the same title and filed on May 18, 2020, which is assigned to the assignee hereof and the contents thereof are hereby expressly incorporated by reference.

FIELD OF THE INVENTION

Embodiments of the invention are directed to systems, methods, and computer program products for providing intelligent and intuitive management of interest bearing time-deposit of resources using a distributed register.

BACKGROUND

In conventional systems, network management of interest bearing time-deposit of resources enterprise environment may be a time-consuming, complex, or inaccurate process. Accordingly, there is a need for a more efficient and accurate way to manage time-deposit resource accounts.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for using a distributed ledger to generate, manage, and store data for interest-pooled time deposit resource accounts. The invention leverages a pooled resource account approach, allowing for multiple disparate resource accounts to benefit from an enhanced interest return by pooling resource accounts (e.g., savings accounts, checking accounts, investment accounts, or the like). The system components of the invention contemplate the use of distributed register technology to provide a verified ledger of information related to one or more resource accounts, as well as store system data, user data, and metadata related to the movement and management of resources. By using a distributed register approach to store and verify data related to time-dependent resource account services, the invention provides an automated system and methods for enhancing the flow of sensitive verified information, reducing the need for manual review and increasing the speed at which various resource account services can be validated and executed.

The distributed register is also utilized to continuously validate and store data related to a catalog of pooled resource deposit services provided by an entity managing the inventive system. The service catalog may comprise user relationship management services, resource planning services, product lifecycle management services, and entity relationship management services, which are able to access, store, and retrieve data from a permissioned distributed register system. Embodiments of the invention may also be tailored to the unique needs or characteristics of one or more geographical regions or markets, such that the products and services offered are designed to comply with varying locally regulations, policies, and customs. The system may further comprise one or more updating components which may trigger the addition of updated data records for one or more resource accounts in the distributed ledger. In this way, the system provides for a highly efficient way to generate, record, and monitor time deposit resource accounts and associated data.

Accordingly, embodiments of the present disclosure provide a system for managing resource tracking data in a distributed register, comprising: a processor; a communication interface; and a memory having a copy of the distributed register and executable code stored thereon, wherein the executable code, when executed by the processor, causes the processor to: receive resource account data for one or more resource accounts from one or more entities or user devices; receive a request to enroll one or more resource accounts in a pooled time deposit resource account; enroll the one or more resource accounts in the pooled time deposit resource account; submit, using a consensus algorithm, a proposed data record for the pooled time deposit account via a distributed register interjector; append the proposed data record to an entry in the distributed register; access the distributed register and identify the one or more resource accounts enrolled in the pooled time deposit resource account; and calculate an account specific accrued interest value for each of the one or more resource accounts enrolled in the pooled time deposit resource account.

In some embodiments, the accrued interest for the pooled time deposit resource account is greater than accrued interest available for each of the one or more resource accounts individually.

In some embodiments, the resource account data is received at a node of the distributed register.

In some embodiments, the system is further configured to transmit a request for authorization to access a user's resource accounts in response to receiving the request to enroll one or more resource accounts in a pooled time deposit resource account.

In some embodiments, the pooled time deposit resource account further comprises one or more component time deposit resource accounts.

In some embodiments, enrolling the one or more resource accounts in the pooled time deposit resource account further comprises transferring resources from the one or more resource accounts to one or more component time deposit resource accounts.

In some embodiments, the distributed register interjector is a policy interjector, wherein the policy interjector causes the processor to: detect a change in a policy affecting the pooled time deposit resource account; and trigger the resource account system to submit a second proposed data record, the second proposed data record comprising additional resource account data associated with the change in the policy.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
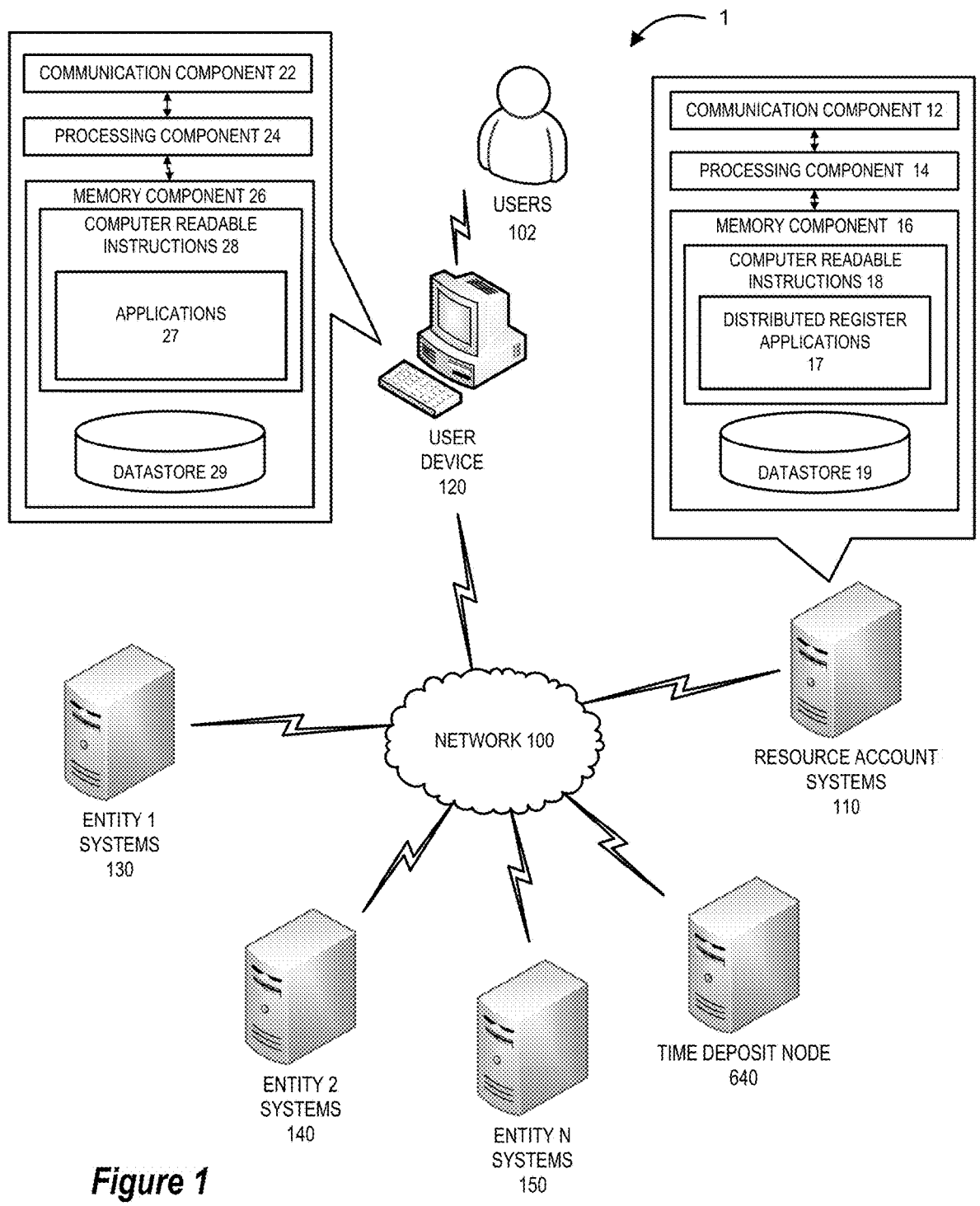
Figure 2:
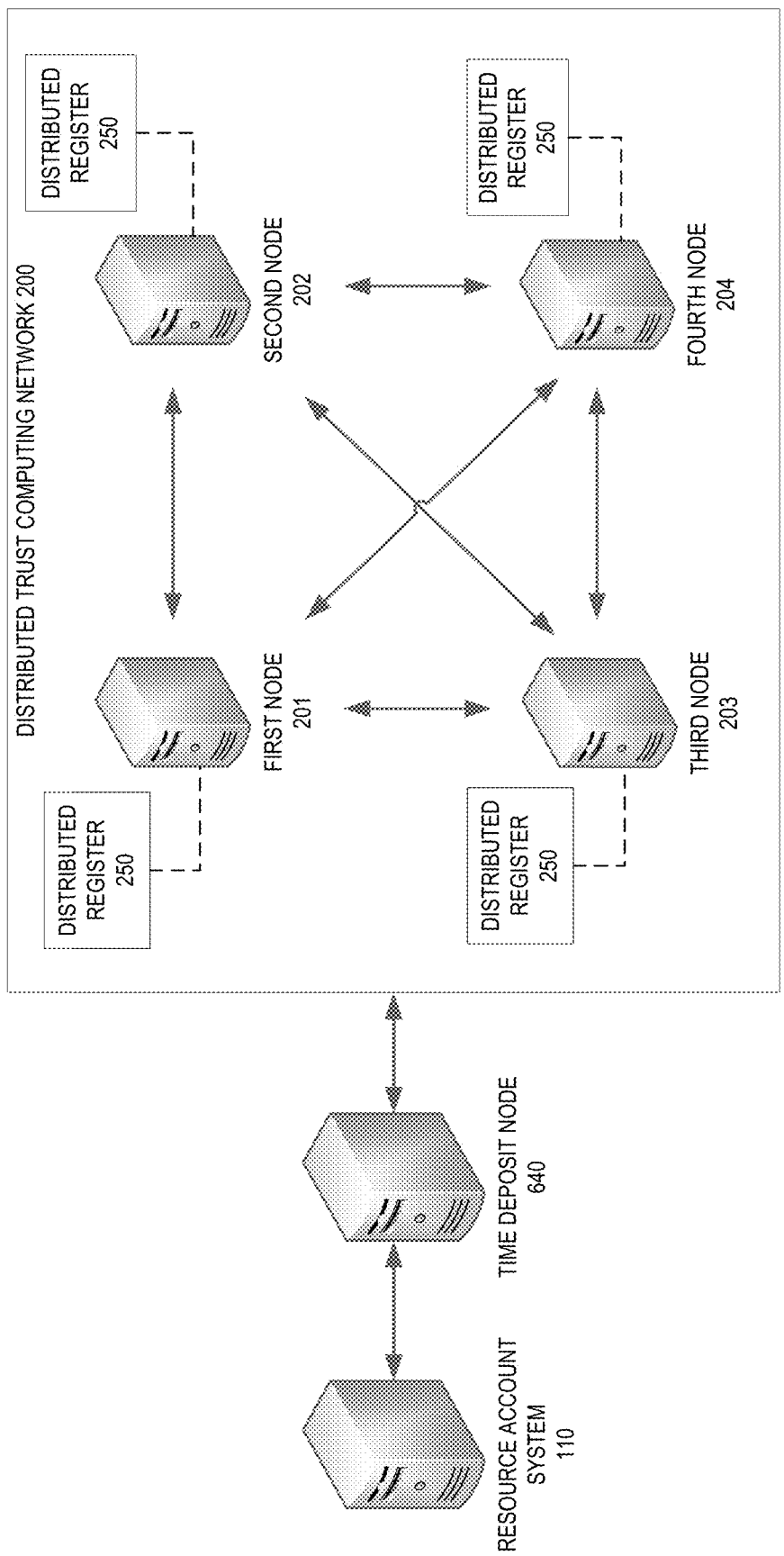
Figure 3:
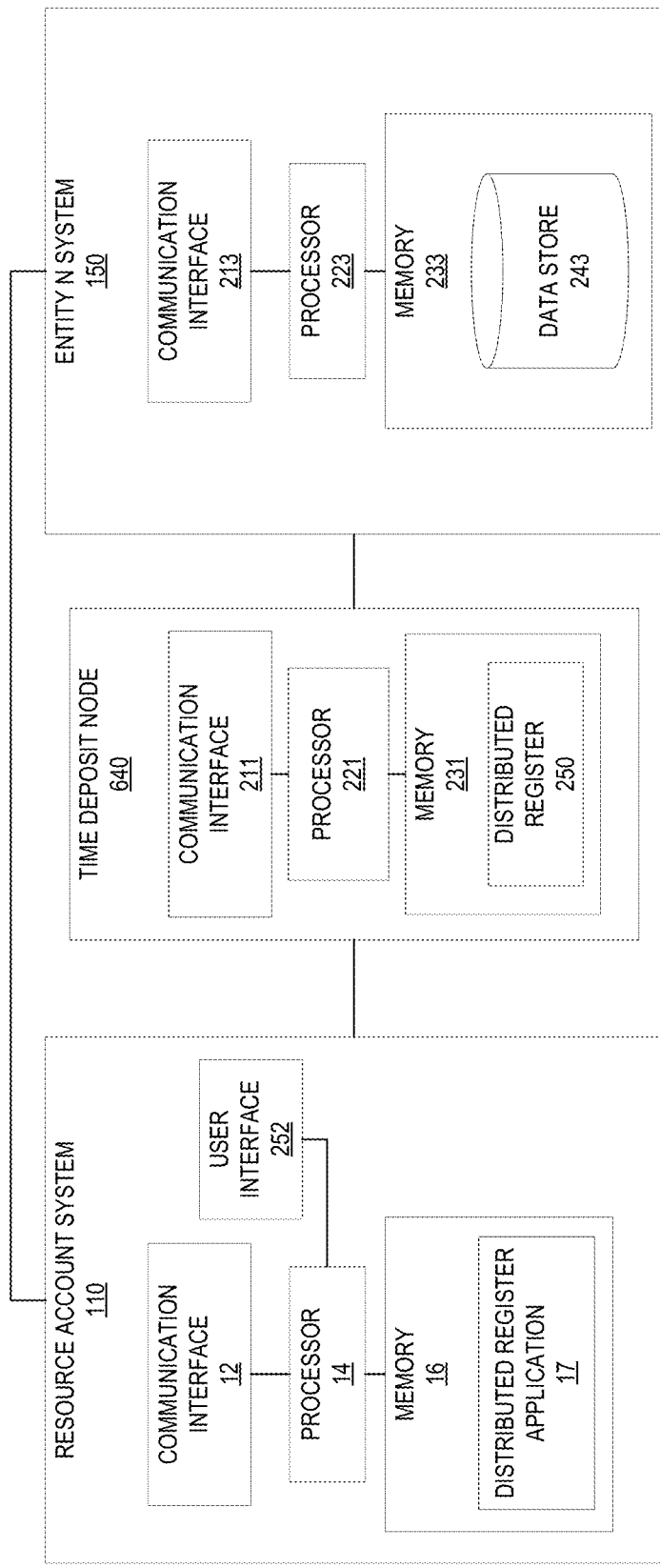
Figure 4:
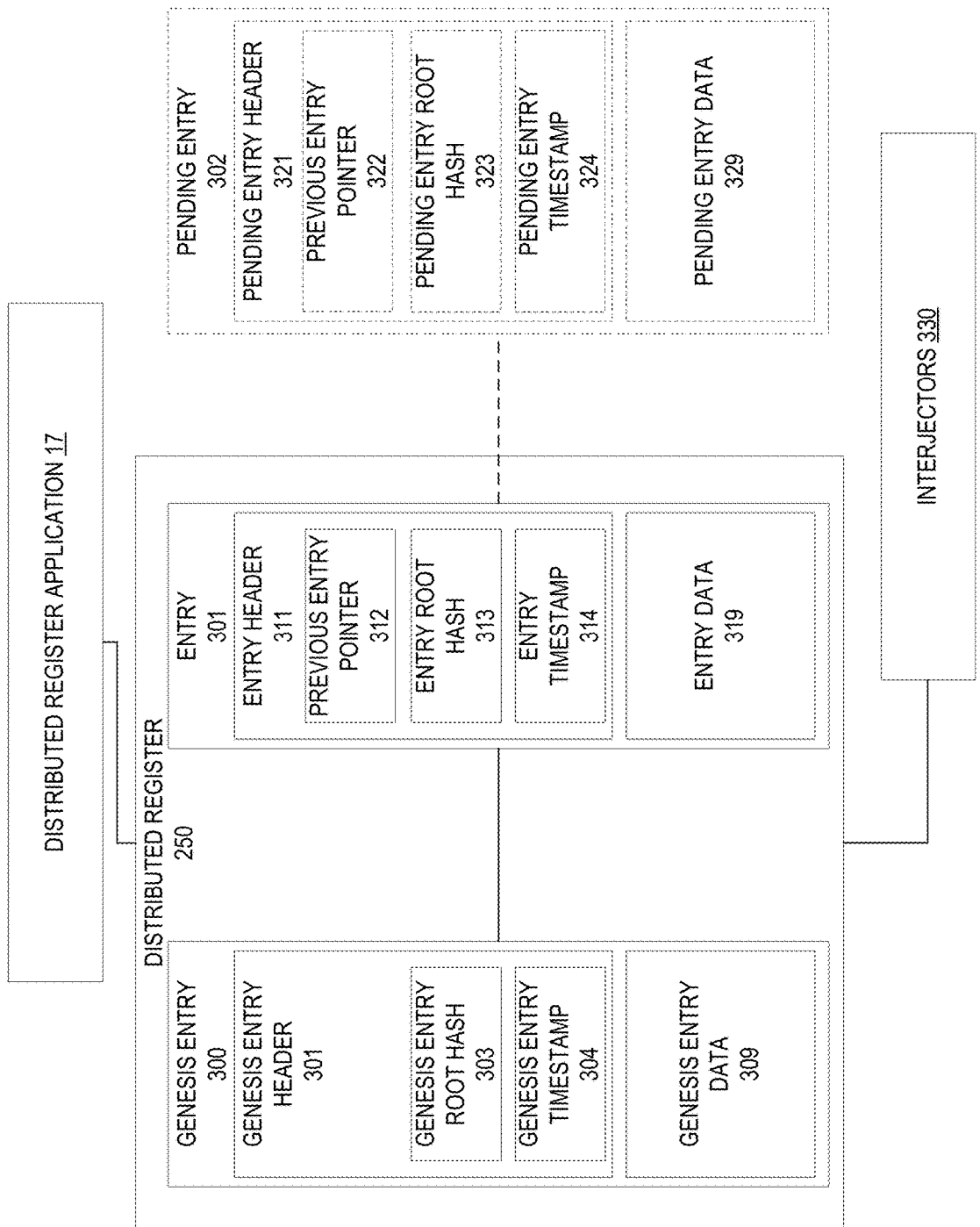
Figure 5:
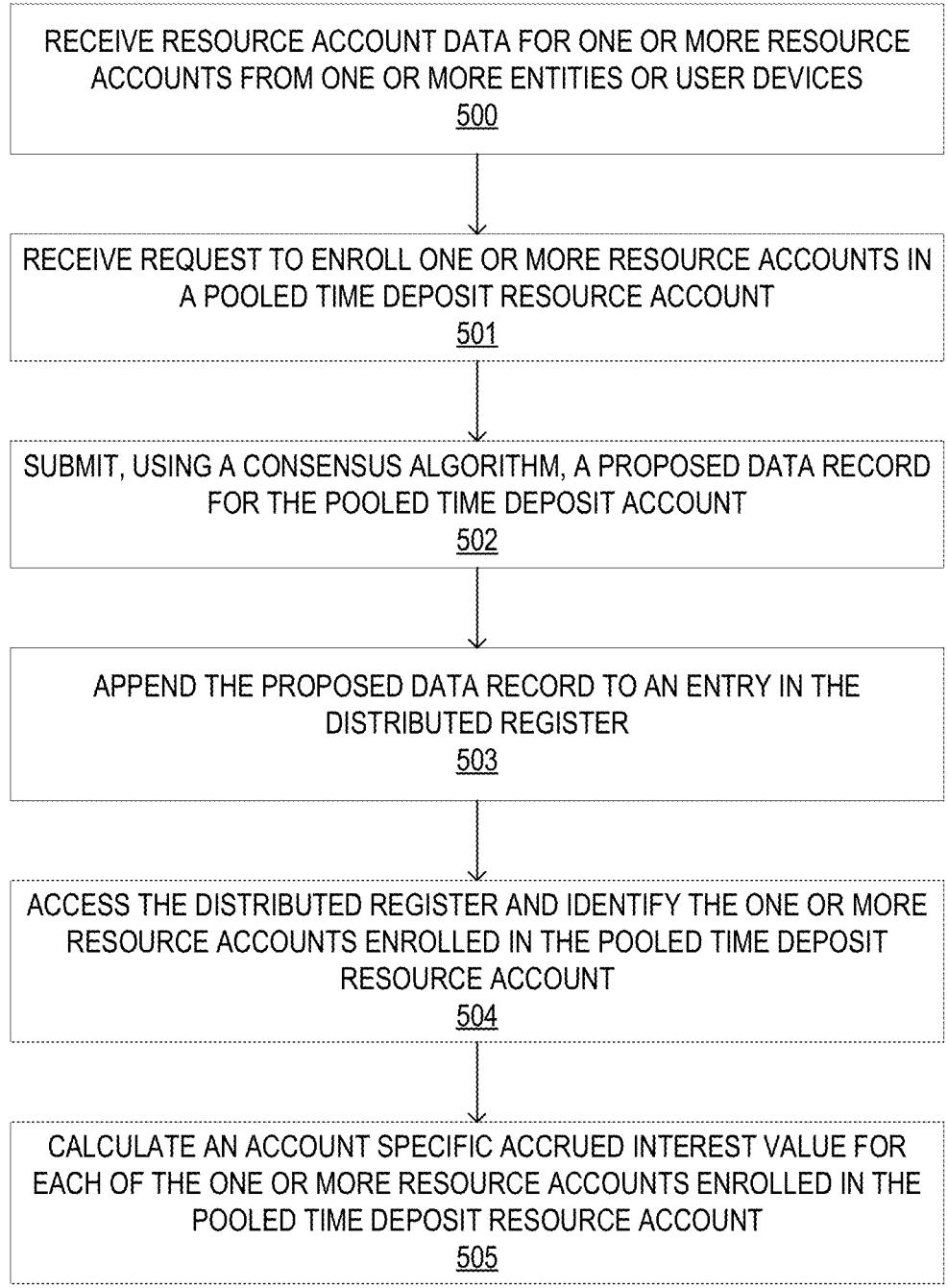
Figure 6:
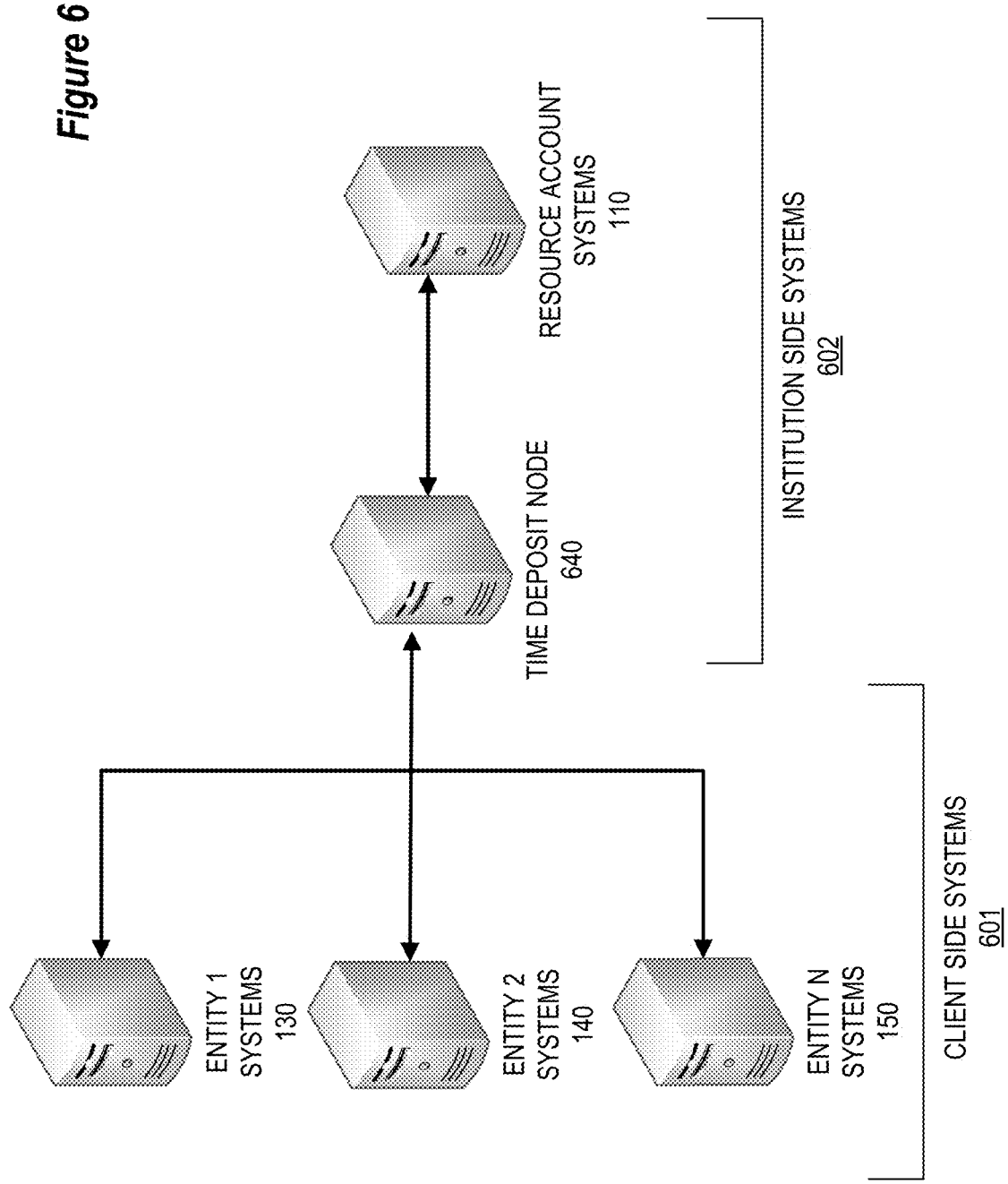

Having thus described embodiments of the disclosure in general terms, reference will now be made to the accompanying drawings, wherein:

FIG. 1 illustrates a resource account system environment 1, in accordance with embodiments of the present disclosure;

FIG. 2 is a block diagram illustrating an operating environment for the distributed trust computing network 200, in accordance with some embodiments of the present disclosure;

FIG. 3 is a block diagram illustrating the data structures within the distributed ledger, in accordance with some embodiments of the present disclosure;

FIG. 4 is a block diagram illustrating the data structures within the distributed register 250, in accordance with some embodiments of the present disclosure;

FIG. 5 is a process flow for the resource account system, in accordance with some embodiments of the present disclosure; and FIG. 6 is block diagram illustrating the data structures for a resource account service data flow, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the distributed register system described herein is implemented. The entity may be a business organization, a non-profit organization, a government organization, or the like, which may routinely use various types of applications within its enterprise environment to accomplish its objectives.

"Entity system" as used herein may refer to computing systems, devices, software, applications, and/or other resources used by an entity to interface with resource account system and distributed register based data storage or services. Accordingly, the entity system may comprise user devices, computers, distributed register database servers, Internet-of-Things ("IoT") devices, networked terminals, smart devices (e.g., smart watches), and/or other types of computing systems or devices along with their associated applications.

"User" as used herein may refer to an individual who may interact with the entity system to store and/or manage resource data or request resource account services. Accordingly, the user may be an agent, employee, associate, contractor, customer, or other authorized party who may access, use, administrate, maintain, and/or manage the computing systems within the entity system. Furthermore, as used herein the term "user device" or "mobile device" may refer to mobile phones, personal computing devices, tablet computers, wearable devices, diagnostic devices, and/or any portable electronic device capable of receiving and/or storing data therein.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Distributed register" or "distributed electronic register" as used herein may refer to a structured list of data records that is decentralized and distributed amongst a plurality of computing systems and/or devices. In some embodiments, the distributed register may be a distributed ledger that includes a chain of entries or entries on a blockchain. As such, distributed register as used herein may also refer to a data structure which may comprise a series of sequentially linked "entries," or "entries," where each entry may comprise data and metadata. The "data" within each entry may comprise one or more "data record" or "transactions," while the "metadata" within each entry may comprise information about the entry, which may include a timestamp, a hash value of data records within the entry, and a pointer (e.g., a hash value) to the previous entry in the distributed register. In this way, beginning from an originating entry (e.g., a "genesis entry"), each entry in the distributed register is linked to another entry via the pointers within the entry headers. If the data or metadata within a particular entry in the distributed register becomes corrupted or modified, the hash values found in the header of the affected entry and/or the downstream entries may become mismatched, thus allowing the system to detect that the data has been corrupted or modified.

Generally, a distributed register is an "append only" register in which the data within each entry within the distributed register may not be modified after the entry is added to the distributed register; data may only be added in a new entry to the end of the distributed register. In this way, the distributed register may provide a practically immutable record of data over time.

"Permissioned distributed register" as used herein may refer to a distributed register for which an access control mechanism is implemented such that only known, authorized users may take certain actions with respect to the distributed register (e.g., add new data records, participate in the consensus mechanism, or the like). Accordingly, "unpermissioned distributed register" as used herein may refer to a distributed register without an access control mechanism.

"Private distributed register" as used herein may refer to a distributed register accessible only to users or devices that meet specific criteria (e.g., authorized users or devices of a certain entity or other organization). Accordingly, a "public distributed register" is a distributed register accessible by any member or device in the public realm.

"Node" as used herein may refer to a computing system on which the distributed register is hosted. Typically, each node maintains a full copy of the distributed register. In this way, even if one or more nodes become unavailable or offline, a full copy of the distributed register may still be accessed via the remaining nodes in the distributed register system.

"Consensus," "consensus algorithm," or "consensus mechanism" as used herein may refer to the process or processes by which nodes come to an agreement with respect to the contents of the distributed register. Changes to the distributed register (e.g., addition of data records) may require consensus to be reached by the nodes in order to become a part of the authentic version of the distributed register. In this way, the consensus mechanism may ensure that each node maintains a copy of the distributed register that is consistent with the copies of the distributed register hosted on the other nodes; if the copy of the distributed register hosted on one node becomes corrupted or compromised, the remaining nodes may use the consensus algorithm to determine the "true" version of the distributed register. The nodes may use various different mechanisms or algorithms to obtain consensus, such as proof-of-work ("PoW"), proof-of-stake ("PoS"), practical byzantine fault tolerance ("PBFT"), or the like.

A "resource" as used herein may refer to funds in a financial account of any denomination or currency type (e.g., dollars, euros, denominations of cryptocurrency, or the like). As such, a "resource account" may refer to an account managed by a financial institution or entity described herein where resources are stored. Resource accounts may be stored, managed, tracked, and maintained by financial institutions or entities, whereas the ownership rights associated with resources in the resource accounts may belong to one or more users or other entities. An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. "Resource tracking data" as used herein may refer resource status data, metadata (e.g., temporal data, location data, ownership data, resource transfer channel data, account numbers, identified patterns, or the like).

Each resource or resource component within the resource account may be assessed using one or more assessment or tracking parameters. In some embodiments, the resource assessments and tracking may be conducted by a user within the entity system. In other embodiments, the resource assessments and tracking may be conducted automatically by one or more computing systems within the entity system. Once an assessment of a resource or resource account has been performed, the results of the assessment may be submitted (e.g., as a pending data record) to be stored within an entry in the distributed register.

In some embodiments, the pending data record containing the proposed resource tracking may be evaluated for validity via a consensus algorithm, where the consensus algorithm may require that a plurality of computing systems transmit approvals of the proposed data record to one another before the proposed data record is added to the distributed register. In an exemplary embodiment, an account may be assessed according to a number of assessment parameters, where the assessment parameters indicate various permissions, geographic locations, resource amounts, ownership, contract terms or the like. In some embodiments, one or more users may manually review the proposed resource assessments or tracking data and transmit approvals. In other embodiments, the review of the proposed resource assessments and tracking data, and transmission of approvals, may be conducted automatically by the computing systems (e.g., nodes) within the entity system. In some embodiments, one or more resource accounts may be "pooled" or the amounts of the one or more resource accounts may be combined into a pooled resource account. The pooled resource account and its associated data may be evaluated and recorded on the distributed register as well. In some embodiments, the pooled resource account may be subject to different assessments parameters based on identified policies, interest rates, regulations, or the like. In some embodiments, the system may be designed to automatically pool resources to leverage identified enhancements or potential enhancements in investment return, security, or the like based on available assessment parameters applicable to the pooled resource account or a threshold value of resources in any account, either pooled or non-pooled. In other embodiments, resources from one or more resource accounts may be pooled into a pooled resource account based on manually set parameters by one or more users or administrators of the resource account systems.

Once the application tracking and assessments have been stored in an entry within the distributed register, the data stored therein within the distributed register may be treated by the entity as a single "true" source of tracking data. That said, over time, conditions may change such that an entity may wish to perform new or updated resource assessments. For example, new resources may be added to a resource account, resources may be transferred or sold off and no longer tracked, or the assessment parameters may change such that certain data is no longer relevant, or new parameters are tracked. In another example, there may be new developments in regulations or policies that necessitate a reassessment of resources within the inventory of the entity system or an outside entity system (e.g., a prime rate of interest may change in a certain location, taxable resources may increase or decrease, or the like.)

In this regard, the resource account system may comprise one or more "interjectors." "Interjector" as used herein may refer to a set of executable program code which may, based on detecting the occurrence of a particular condition, trigger a change in one or more assessment parameters with respect to a certain resource. In an exemplary embodiment, a "service" or "threshold" interjector may detect the existence of a certain resource or resource component threshold being met. In some embodiments, the interjector may detect the existence of said condition based on receiving manual input by a user within the entity's systems. In other embodiments, the interjector may detect the existence of said condition automatically, such as by communicating with a resource, database, or entity system over a network. Upon detecting the occurrence of a particular condition, the interjector may trigger the addition or change in one or more assessment parameters by prompting a user to reassess the resource or by automatically prompting a computing system (e.g., an resource tracking computing system) to perform the reassessment. In some embodiments, the interjectors may be stored and/or executed on computing systems separate from the distributed register nodes. In other embodiments, the interjectors may be stored as smart contract logic as a feature of the distributed register. Using interjectors in this way helps alleviate the efficiency burden (e.g., computing efficiency) of performing repeated or duplicate assessments unnecessarily, as there is no need to reassess a resource; until the interjector triggers such a reassessment, the current state of the distributed register may be taken as the single source of "truth."

The resource account system may further comprise a user interface through which a user may interact with the distributed register. The user interface may comprise graphical elements that allow the user to define, add, and/or update applications, resource assessments, and/or assessment parameters within the distributed register. The user interface may further comprise notification functions which may display alert messages and/or play audible alerts. For instance, an interjector may prompt the user to define an additional assessment parameter by displaying a notification message via a notification window. The user interface may further be configured to allow the user to add, edit, or configure the various interjectors and/or their associated conditions or triggers. In this regard, embodiments of the present disclosure provide a system, computer program product, and method for using a distributed register to conduct, manage, and store resource account data and account services. In particular, the entity system may comprise a resource account tool or resource account application wherein a user may deposit or withdraw resources, create new accounts, generate smart contracts based on available resources, or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored. In other embodiments, the resource information related to the smart contract may be related to a resource agreement (e.g., single provisions, multiple provisions, or an entire resource agreement) in which two or more entities have agreed to terms with respect to a resource amount or resource account. As such, the resource agreement may be related to storage, access, and/or dissemination of resources or portions thereof according to validated terms of the smart contract.

The system as disclosed herein addresses a number of technology-centric challenges associated with tracking resources and managing resource account data. By using a distributed register with interjectors as described herein, the system may reduce the occurrence of inconsistent data, duplicative assessments, uncertainty about a resources amount, access, ownership, location, and/or compliance with regulations or policies, or the like. In turn, the computing efficiency associated with performing resource account assessments within the entity system may be greatly increased. Furthermore, storing assessment and tracking data within a distributed register helps ensure the integrity and security of the resource account data, thereby reducing the likelihood of data loss through corruption and/or tampering.

FIG. 1 illustrates a resource account system environment 1, in accordance with embodiments of the invention. As illustrated in FIG. 1, resource account systems 110 are operatively coupled, via a network 100, to one or more user devices 120, entity 1 systems 130, entity 2 systems 140, entity N systems 150 (e.g., any number of other entity systems), time deposit node 640, or other like systems. It should be understood that the resource account systems 110 may comprise the systems that are utilized to manage the resource account system environment 1. It should be further understood that the nodes of a distributed computing network 200, further described with regard to FIG. 2, may comprise both resource account systems 110 and user devices 120. The user devices 120, or a portion thereof, may also be nodes of the distributed computing network 200 (e.g., may be a system of the resource account systems 110). Alternatively or additionally, the user devices 120 may be associated with individual entities (e.g., entity 1, entity 2, entity N, which may be companies, individual users, or the like), or may be part of an entity system 130, 140, 150. The user devices 120 may access nodes of the resource account systems 110 on behalf of an entity (e.g., organizations, individual users, or the like). Furthermore, the entity systems 130, 140, 150, or a portion thereof, may be nodes of the resource account systems 110. Alternatively, or additionally, the user devices 120 and/or the organization systems 130, 140, 150 may not be nodes (e.g., not a part of the resource account systems 110, and instead are used merely to operate the organization systems and/or access the resource account systems 110).

Consequently, the resource account systems 110 may be separate systems that are nodes for distributed computing network 200 and/or in some embodiments may include the user devices 120 and/or organization systems 130, 140, 150, or a portion thereof as nodes. As such, regardless of whether or not the user devices 120 are nodes, the users 102 may utilize the user devices 120 to access, store, distribute, or the like resource information related to resources on a distributed register, as will be described in further detail herein. In some embodiments, the resource account systems 110 may be private distributed register systems, public distributed register systems, or hybrid distributed register systems (public and private distributed register systems), which will be described in further detail herein.

The environment 1 may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the resource account systems 110 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 100 and other components on the network 100, such as, but not limited to, the user devices 120, the entity 1 systems 130, the entity 2 systems 140, the entity N systems 150, time deposit node 640, or other like systems. As such, the one or more communication components 12 generally comprise a wireless transceiver, modem, server, electrical connection, electrical circuit, or other component for electronically communicating with other components on the network 100. The one or more communication components 12 may further include an interface that accepts one or more network interface cards, ports for connection of network components, Universal Serial Bus (USB) connectors or the like.

As further illustrated in FIG. 1, the resource account systems 110 comprise computer-readable instructions 18 stored in the memory component 16, which in one embodiment includes the computer-readable instructions 18 of the distributed register applications 17. In some embodiments, the one or more memory components 16 include one or more data stores 19 for storing data related to the resource account systems 110, including, but not limited to, data created, accessed, and/or used by the distributed register application 17.

It should be understood that the resource account systems 110, and the components therein, may be one or more private distributed registers, one or more public distributed registers, and/or one or more hybrid distributed registers.

The resource account systems 110 and distributed register application 17, as will be described in further detail herein, may allow for resource account management (e.g., resource balance assessment, resource deposits, pooled deposits, resource account creation, or the like), tracking of resource account events (e.g., resource transfers, earned interest, or the like), resource agreements (e.g., smart contracts, or the like), and for the determination of resource suggestions (e.g., recommended resource transfers, deposits, investments, or the like) based on resource performance and resource thresholds (e.g., amount requirements for resource pooling). As explained in further detail later the distributed register systems 10 may be located in or associated with the other systems described herein.

As illustrated in FIG. 1, users 102 may access the distributed register application 17 on the one or more distributed systems 10, or a portion thereof stored on other systems (e.g., a portion of the distributed application 17 stored on other user devices 20 or on the entity systems 130, 140, 150), or through other applications, through the user devices 120. The user device 120 may be a desktop, laptop, tablet, mobile device (e.g., smartphone device, or other mobile device), or any other type of computer that generally comprises one or more communication components 22, one or more processing components 24, and one or more memory components 26. In some embodiments the user device 120 may contain a locally stored resource wallet that provides data to the resource account systems 110 or one or more entity systems 130, 140, or 150 (e.g., an electronic currency wallet, or the like). In other embodiments, the user device may be a smart home device designed to interface with the user to accept auditory commands in the natural language of the user and forward such data to the resource accounts systems 110 for further language processing. In such embodiments, various services provided by the resource account systems may be provided to the user via the smart home device (e.g., resource account balance request, initiation of resource transfers between one or more accounts, or the like).

The one or more processing components 24 are operatively coupled to the one or more communication components 22, and the one or more memory components 26. The one or more processing components 24 use the one or more communication components 22 to communicate with the network 100 and other components on the network 100, such as, but not limited to, the resource account systems 110, the entity 1 systems 130, the entity 2 systems 140, the entity N systems 150, time deposit node 640, or other systems. As such, the one or more communication components 22 generally comprise a wireless transceiver, modem, server, electrical connection, or other component for communicating with other components on the network 100. The one or more communication components 12 may further include an interface that accepts one or more network interface cards, ports for connection of network components, Universal Serial Bus (USB) connectors or the like. Moreover, the one or more communication components 22 may include a keypad, keyboard, touch-screen, touchpad, microphone, mouse, joystick, other pointer component, button, soft key, and/or other input/output component(s) for communicating with the users 102.

As illustrated in FIG. 1, the user devices 120 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. As previously discussed, the distributed register application 17, or a portion thereof, may be stored on one or more of the user device 120. In some embodiments, data may be provided to the user device or one or more entity systems from the resource accounts systems 110 using application programming interface (API) language in order to securely receive and respond to requests for various data.

In some embodiments the user device 120 may be operatively coupled to a resource in order to become a resource system (e.g., capture information from the resource and transfer the information). For example, the user device 120 may connect to the resource through a wire or communicate wirelessly with the resource. As such, in some embodiments the resource may communicate directly with other systems over the network 100. Consequently, in some embodiments the resource system may be a node within the resource account system environment 1.

As illustrated in FIG. 1, the entity 1 systems 130, the entity 2 systems 140, the entity N systems 150, time deposit node 640, or other systems are operatively coupled to the resource account systems 110 and/or user devices 120, through the network 100. These systems have components that are the same as or similar to the components described with respect to the resource account systems 110 and/or user devices 120 (e.g., one or more communication components, one or more processing components, and one or more memory devices with computer-readable instructions of one or more applications, one or more datastores, or the like). Thus, the entity 1 systems 130, the entity 2 systems 140, the entity N systems 150, time deposit node 640, or other systems communicate with the resource account systems 110, the user devices 120, and/or each other in same or similar way as previously described with respect to the resource account systems 110 and/or the user devices 120. The entity systems 130, 140, 150 may be made up of one or more user devices 120, one or more of the resource account systems 110, or portions of any of the foregoing systems, and as such may act as nodes (explained in further detail with respect to FIG. 2) which are utilized to store, allow access to, disseminate, validate, or the like resource information.

FIG. 2 is a block diagram illustrating an operating environment for the distributed trust computing network 200, in accordance with some embodiments of the present disclosure. In particular, the operating environment may include a plurality of distributed register nodes 201, 202, 203, 204 in operative communication with one another within the distributed trust computing network 200. The distributed trust computing network 200, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 201, the second distributed register node 202, the third distributed register node 203, and the fourth distributed register node 204 may be computing systems which host the distributed register 250. In some embodiments, the distributed register 250 may comprise the data for all resources within the entity system. Accordingly, the distributed ledger nodes 201, 202, 203, 204 are typically networked terminals or servers, but may also be desktop computers, laptops, smartphones or smart devices, IoT devices, or the like, or any combination thereof. Typically, each distributed register node 201, 202, 203, 204 hosts a complete copy of the distributed register 250. The contents of the various copies of the distributed register 250 hosted on the distributed register nodes 201, 202, 203, 204 may be updated to be consistent with one another via a consensus algorithm executed by the distributed register nodes 201, 202, 203, 204. In this way, a complete and verified copy of the distributed register 250 may remain accessible even if the copy of the distributed register 250 stored on one or more distributed register nodes 201, 202, 203, 204 become inaccessible (e.g., due to being offline, experiencing high network latency, or the like) or corrupted (e.g., due to hardware/software errors, unauthorized modification of distributed register contents, or the like).

The operating environment may further comprise a resource account system 110 which may be in operative communication with the distributed register nodes 201, 202, 203, 204 of the distributed trust computing network 200 via time deposit node 640. The resource account system 110 may be a computing system that submits resource account data to the nodes 201, 202, 203, 204 in the form of proposed data records to be added to the distributed register 250. The resource account system 110 may further be used to manage interjectors and receive notifications regarding the account data within the distributed register 250. Accordingly, the resource account system 110 may be a desktop computer, laptop computer, smartphone, tablet, smart device, IoT device, single board computer, or the like. In some embodiments, resource account system 110 may be operated by a user within the entity. In other embodiments, the resource account system 110 may automatically perform various functions to manage account data and/or interjectors.

The submission and receipt of data between resource account system 110 and the distributed trust computing network 200 may be achieved through the time deposit node 640 and immediately processed for submission to the distributed register, such that that data hops or manual data touchpoints are reduced to preferably zero, allowing the system to maintain maximum integrity of data validation. The automated flow of permissioned ledger data allows the leveraging of distributed register technology and distributed register based services directly to client side systems 602. The resource account system 110 may be designed to provide a catalog of services via the time deposit node 640 to client side systems. For instance, the service catalog may comprise user relationship management services, resource planning services, product lifecycle management services, and entity relationship management services, which are able to be accessed by client side systems to store, and retrieve data from a permissioned distributed register system via time deposit node 640.

It should be understood by those having ordinary skill in the art that although the distributed register nodes 201, 202, 203, 204, and/or the resource account system 110 are depicted as single units, each of the depicted components, or sub-components therein, may represent multiple units. In some embodiments, a given computing system as depicted in FIG. 2 may represent multiple systems configured to operate in a distributed fashion. In other embodiments, the functions of multiple computing systems may be accomplished by a single system. For instance, the functions of the resource account system 110 may be accomplished by one or more of the distributed register nodes 201, 202, 203, 204. It should further be understood that even though reference may be made to a single "distributed trust computing network 200," all singular usages of "distributed trust computing network" or "distributed register" may also refer to multiple distributed registers. For instance, separate distributed registers may be stored on the nodes 201, 202, 203, 204 on a per-application or per-parameter basis.

FIG. 3 is a block diagram illustrating the first distributed register node 201 and the resource account system 110 in more detail, in accordance with some embodiments of the present disclosure. The time deposit node 640 may comprise a processor 221 communicably coupled to such devices as a communication interface 211 and a memory 231. It should be understood that the time deposit node 640 as depicted in FIG. 3 may represent any or all of the distributed register nodes 201, 202, 203, 204 as depicted in FIG. 2. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The time deposit node 640 may use the communication interface 211 to communicate with other devices over the distributed trust computing network 200. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the time deposit node 640 may comprise a copy of the distributed register 250. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory, solid state memory, or the like. In some embodiments, the memory 231 of the time deposit node 640 may further comprise smart contract logic for one or more interjectors.

Typically, the time deposit node 640, along with the other nodes within the distributed trust computing network 200, maintain a complete copy of the distributed register 250. The time deposit node 640 may be configured to communicate with the other nodes to determine the contents of the distributed register 250 stored thereon. For instance, the nodes within the distributed trust computing network 200 may use one or more consensus algorithms (e.g., Proof-of-Work, Proof-of-Stake, Practical Byzantine Fault Tolerance, or the like) to add proposed data records to each of the individual copies of the distributed register 250. In other embodiments, the nodes 201, 202, 203, and 204 may execute smart contract logic to add proposed data records.

As discussed in FIG. 1, the resource account system 110 may also comprise a processor 14 communicatively coupled with such devices as a communication interface 12 and a memory 16. Typically, the resource account system 110 interacts with the time deposit node 640 to access the distributed register 250 therein. Accordingly, the resource account system 110 may be a desktop computer, networked terminal, laptop computer, tablet, smartphone, or the like. In embodiments in which the resource account system 110 is operated by a user, the assessments computing system 110 may be configured to interface with the user, who may use the resource account system 110 to access the access, view, and/or submit proposed data records within the distributed register 250. The resource account system 110 may further be used to manage the distributed register interjectors. In this regard, the resource account system 110 may further comprise a user interface 252, which may comprise the hardware and software implements to accept input from and provide output to the user. The user interface 252 may comprise hardware such as a display, audio output devices, projectors, or the like, or input devices such as keyboards, mice, sensors, cameras, microphones, biometric input devices (e.g., fingerprint readers), or the like. The user interface 252 may further comprise software such as a graphical or command-line interface through which the user may provide inputs and/or receive outputs from the resource account system 110. It should be understood that the display on which the user interface 252 is presented may include an integrated display (e.g. a tablet or smartphone screen) within the resource account system 110, or an external display device (e.g. a computer monitor or television).

The memory 232 of the resource account system 110 may comprise a distributed register application 17 stored thereon. The distributed register application 17 may include software that allows the resource account system 110 to submit proposed data records to the distributed register 250, where the proposed data records comprise resource account data or pooled resource account data. In some embodiments, the resource account system 110 may automatically submit resource account data to the distributed register 250. In such embodiments, the distributed register application 17 may be configured to upload data to the time deposit node 640 upon being prompted by a distributed register interjector. In other embodiments, a user may use the resource account system 110 to upload data and/or participate in consensus to validate proposed data records. In such embodiments, the distributed register application 17 may include an entity-provided application or other third party application which interfaces with the user to allow the user to communicate with the time deposit node 640. For instance, in some embodiments, the distributed register application 17 may include a web browser or the like which allows the user to access a web server to upload data, send or receive data through an API interface, participate in validation of data records, manage distributed register interjectors, or the like. In certain embodiments, the distributed register application 17 may further comprise distributed register interjectors which prompt the addition or update of data within the distributed register 250.

The time deposit node 640 and/or the resource account system 110 may further be in operative communication with one or more entity systems, such as entity system N 150. The entity N system 150 may comprise a communication interface 213, a processor 223, and a memory 233 having a data store 243 stored thereon. The data store 243 may comprise the types of data needed by the resource account system 110 to perform account management. For example, the data store 243 may comprise a continuously updated list of resource account information, or may comprise a continuously updated list of entity policies, regulations, interest rates, market data, or the like. Based on the data store 243, the resource account system 110 may define new parameters or update existing parameters for each resource account or pooled resource account.

FIG. 4 is a block diagram illustrating the data structures within the distributed register 250, in accordance with some embodiments. In particular, FIG. 4 depicts a plurality of entries 300, 301 within the distributed register 250, in addition to a proposed entry 302 that has been submitted to be appended to the distributed register 250. The distributed register 250 may comprise a genesis entry 300 that serves as the first entry and origin for subsequent entries in the distributed register 250. The genesis entry 300, like all other entries within the distributed register 250, comprise entry header 301 and entry data 309. The genesis entry data 309, or any other instances of entry data any entries in the distributed register 250 may contain various data records.

The genesis entry header 301 may comprise various types of metadata regarding the genesis entry data 309. In some embodiments, the entry header 311 may comprise a genesis entry root hash 303, which is a hash derived from an algorithm using the genesis entry data 309 as inputs. In some embodiments, the genesis root hash 303 may be a Merkle root hash, wherein the genesis entry root hash 303 is calculated via a hash algorithm based on a combination of the hashes of each data record within the genesis entry data 309. In this way, any changes to the data within the genesis entry data 309 will result in a change in the genesis entry root hash 303. The genesis entry header 301 may further comprise a genesis entry timestamp 304 that indicates the time at which the entry was written to the distributed register 250. In some embodiments, the timestamp may be a Unix timestamp. In some embodiments, particularly in distributed registers utilizing a PoW consensus mechanism, the entry header 301 may comprise a nonce value and a difficulty value. The nonce value may be a whole number value that, when combined with a hash of the other items of metadata within the entry header 301, produces a hash output that satisfies the difficulty level of the cryptographic puzzle as defined by the difficulty value. For instance, the consensus mechanism may require that the resulting hash of the entry header 301 falls below a certain value threshold (e.g., the hash value must start with a certain number of zeroes, as defined by the difficulty value).

A subsequent entry 301 may be appended to the genesis entry 300 to serve as the next entry in the distributed register. Like all other entries, the entry 300 comprises an entry header 311 and entry data 319. Similarly, the entry header 311 comprise an entry root hash 313 of the data within the entry data 319 and an entry timestamp 314. The entry header 311 may further comprise a previous entry pointer 312, which may be a hash calculated by combining the hashes of the metadata (e.g., the genesis entry root hash 303, genesis entry timestamp 304, or the like) within the entry header 301 of the genesis entry 300. In this way, the entry pointer 312 may be used to identify the previous entry (i.e., the genesis entry 300) in the distributed register 250, thereby creating a "chain" comprising the genesis entry 300 and the entry 301.

The value of a previous entry pointer is dependent on the hashes of the entry headers of all of the previous entries in the chain; if the entry data within any of the entries is altered, the entry header for the altered entry as well as all subsequent entries will result in different hash values. In other words, the hash in the entry header may not match the hash of the values within the entry data, which may cause subsequent validation checks to fail. Even if an unauthorized user were to change the entry header hash to reflect the altered entry data, this would in turn change the hash values of the previous entry pointers of the next entry in the sequence. Therefore, an unauthorized user who wishes to alter a data record within a particular entry must also alter the hashes of all of the subsequent entries in the chain in order for the altered copy of the distributed register to pass the validation checks imposed by the consensus algorithm. Thus, the computational impracticability of altering data records in a distributed register in turn greatly reduces the potential of improper alteration of data records.

A pending entry 302 or "proposed entry" may be submitted for addition to the distributed register 250. The pending entry 302 may comprise a pending entry header 321, which may comprise a pending entry root hash 323, a previous entry pointer 322 that points to the previous entry 301, a pending entry timestamp 324, and pending entry data 329. Once a pending entry 302 is submitted to the system, the nodes within the system may validate the pending entry 302 via a consensus algorithm. The consensus algorithm may be, for instance, a proof of work mechanism, in which a node determines a nonce value that, when combined with a hash of the entry header 311 of the last entry in the distributed register, produces a hash value that falls under a specified threshold value. For instance, the PoW algorithm may require that said hash value begins with a certain number of zeroes. Once said nonce value is determined by one of the nodes in the distributed register, the node may post the "solution" to the other nodes in the distributed register. Once the solution is validated by the other nodes, the hash of the entry header 311 is included in the pending entry header 321 of the pending entry 302 as the previous entry pointer 322. The pending entry header 321 may further comprise the pending entry root hash 323 of the pending entry data 329 which may be calculated based on the winning solution. The pending entry 302 is subsequently considered to be appended to the previous entry 301 and becomes a part of the distributed register 250. A pending entry timestamp 324 may also be added to signify the time at which the pending entry 302 is added to the distributed register 250. In other embodiments, the consensus mechanism may be based on a total number of attestations submitted by the nodes of the distributed register 250, e.g., a PBFT consensus mechanism. Once a threshold number of attestations to validate the pending entry 302 has been reached, the pending entry 302 may be appended to the distributed register 250. In such embodiments, nonce values and difficulty values may be absent from the entry headers.

The system described herein may use one of several different paradigms for entry creation. In some embodiments, an entry may be generated whenever new assessment parameters or applications are defined. In some embodiments, the system may wait to receive inputs for all known assessment parameters for all applications before generating an entry. In other embodiments, entries may be generated on a per-application basis. In yet other embodiments, new entries may be generated for each assessment that is made by the resource account system. Other possibilities exist, as the entity may select its entry generation methods based on striking a balance between computing efficiency and detailed record keeping over a period of time.

The resource account system, via the distributed register application 17, may submit a proposed data record to the distributed register 250, where the proposed data record may comprise a new or updated assessment parameter, resource data, new or updated metadata regarding a resource, or the like. In this way, the distributed register application 17 may be used to manage data, account parameters, assessment data, or the like. Furthermore, because such data is added in time-stamped entries to the distributed register, the system is able to reliably and accurately recreate the state of the resources) within the entity system at any particular point in time.

The data records may comprise resource account data, pooled resource account data, or resource agreement data associated with one or more accounts within the system. In particular, each account within the entity system may be assigned an identifier (e.g., a character string, hash value, numerical identifier, or the like). For instance, in some embodiments, the accounts may be labeled in numerical order (e.g., account 1, account 2, or the like). In other embodiments, the accounts may be logged according to an existing resource identifier, such as an account number, user identifier, pin code, wallet address, routing number, combination of identifiers, or the like. In further embodiments, an existing account number may be logged as associated with a separate account identifier that is used to log data in the distributed register (e.g., account number 1 associated with user 1, or account number 1 associated with pooled account number 1, or the like). The assessment or tracking parameters used to track each account may also each be assigned an assessment parameter identifier. For instance, the assessment parameters may be numbered (e.g., Assessment Parameter 1, Assessment Parameter 2, or the like). Assessment parameters may include, but are not limited to, tracking each particular account's financing terms, amount, interest rate or amount, current market value, ownership information, managing entity information, regulatory jurisdiction, or the like.

For instance, the resource account system 110 may receive data on federal, state, or local laws, policies, regulations, or the like. In other embodiments, the resource account system 110 may receive data related to interest rate, inflation rate, exchange rate, or the like. As the resource account system 110 receives data, the system may dictate how resources or accounts may be pooled. In some embodiments, this data may be based on a specific entity policies, thresholds, user preferences, or the like. For instance, the entity or institution managing the resource account systems may set a threshold maximum amount for each pooled resource account, or likewise may set a minimum threshold amount for each pooled resources account or component account that makes up each pooled account so as to maximize efficiency. In other embodiments, resource accounts may be pooled based on other data, such as metadata describing the intended nature of the account (e.g., long term savings account, short term investment account, or the like). In other embodiments, the resource account system 110 may receive real-time data from the resources and determine that the assessment parameters indicate a potentially important condition, such as a sudden market change. For instance, resources pooled in one pooled account may benefit from a fluctuating exchange rate or potentially profitable change in interest rate.

In any embodiment, the resource account system 110 may, via the distributed register application 17, participate in validating proposed assessment and tracking data records through a consensus algorithm, along with the nodes of the distributed register 250. For example, a new parameter which coincides with a newly created pooled resource account may be proposed to be added to the distributed register 250. In such embodiments, the resource account system 110 may be used to verify that the new resource account adequately and accurately reflects the resource amounts in the component accounts. The resource account system 110 may further ensure that the data to be entered reflects that the resource assessment has been correctly executed. For instance, the system may require corroboration with outside data sources on market conditions, resource account amounts, or the like before an assessment is considered to be valid (e.g., resource account system 110 may ping one or more entity systems to receive an updated resource account balance). If the required parameters are missing or cannot be corroborated from the received data, the resource account system 110 may either reject the proposed data record containing the data or delay validating the proposed data record until the missing inputs are provided.

In some embodiments, the distributed register application 17 of the resource account system 110 may be used to define an initial set of parameters within the entry data (e.g., the genesis entry data 309) of an entry (e.g., the genesis entry 300) for each resource in the entity system. In such embodiments, when the resource account system 110 submits proposed data records to be appended to the distributed register 250 in subsequent entries, the consensus algorithm may require that a parameter and resource has been defined in one of the previous entries in order for the proposed data record to be considered valid. For instance, if a proposed data record comprises an assessment for Resource Parameter 1 with respect to Resource 1, the system may first verify that the Resource Parameter 1 and Resource 1 have been defined in a previous entry (e.g., the genesis entry 300). If the definitions of the parameter and resource are not found, the proposed data record may be considered to be invalid. It should be noted that while parameters may be defined in the genesis entry 300, it is within the scope of the disclosure for new or updated parameters and/or resources to be defined in any entry within the distributed register 250.

Over time, it may become necessary to adjust account tracking processes in response to changes in the operating environment, entity requirements, technical advances, new security threats, changes in regulations or policies, or the like. In this regard, the system may use one or more interjectors 330 to cause a new entry to be created which contains the new tracking parameters, data, and/or metadata. "Interjector" may generally refer to the hardware and software implements that trigger the addition or updating of data within a new entry (e.g., the pending entry 302). In some embodiments, the interjector may be stored on the resource account system 110. In other embodiments, the interjectors may be executed as smart contracts by the nodes of the distributed register 250.

An interjector 330 may detect the existence of a condition that requires a change in the metadata, tracking or assessment data, account tracking parameters, or other type of data within the distributed register 250. For example, the "condition" may be the emergence of a new type of computer virus or security vulnerability which necessitates the evaluation of particular applications to assess their vulnerability to the virus or malfeasant code. In other embodiments, the condition may be a new internal policy with which all accounts must comply, such as an anti-money laundering or know your customer regulation, which in turn necessitates a renewed assessment of accounts to ensure the compliance with the new policy. Upon detecting the condition, the interjector 330 may trigger the addition of new data records to the distributed register 250 via the distributed register application 17. In some embodiments, the system may recognize that further data is required in order to maintain compliance, and may automatically request such data from one or more entities or users.

In embodiments in which the new data records are added manually, the interjector 330 may send an alert or notification to the user through the resource account system 110, where the alert or notification prompts the user to enter the necessary information (e.g., a renewed assessment, a new account parameter, or the like). The alert or notification may comprise a link (e.g., a hyperlink, or the like) that, when activated, opens a graphical interface on resource account system 110 (e.g., a web browser pointing to a web server) which provides graphical elements that allow the user to input the necessary information (e.g., resource data). Once the user submits the necessary information, the resource account system 110 may submit a proposed data record to the distributed register 250, where the proposed data record contains the information provided by the user to be incorporated into the distributed register 250. In embodiments in which the new data records are added automatically, the interjector 330 may cause the resource account system 110 to automatically retrieve resource data and submit the necessary information to the distributed register 250 in the form of a proposed data record.

Various types of interjectors 330 may be used to trigger the addition of data records to the distributed register. For example, the interjectors 330 may include a "recall or vulnerability interjector" that triggers inputs of assessment data relating to a new defect or vulnerability affecting a resource, a "policy interjector" or "regulations interjector" that triggers inputs of assessment data based on regulations or standards that affect a resource, a "reassessment clock interjector" or "periodic interjector" which triggers reassessments after a threshold period of time has elapsed since a resource has last been assessed (e.g., periodically retrieving vehicle mileage data, fuel consumption data, crash reports, service history, or the like), a "circumstance interjector" which triggers assessments based on the occurrence of certain incidents, events, or problems, or the like (e.g., service, repairs, transfer of ownership, or the like). It should be understood that the interjectors 330 described above are provided for exemplary purposes only, and that other types of interjectors 330 and/or triggers may be used depending on the entity's needs.

FIG. 5 is a process flow for the resource account system, in accordance with some embodiments of the present disclosure. The process begins at block 500, where the system receives resource account data for one or more resource accounts from one or more entities or user devices. In some embodiments, the system may receive resource account data from one or more entity systems designed to share data with the resource account system. In other embodiments, an entity system (e.g., entity system 1, 2, N, or the like) or a user device may interact with the resource account system via an application stored on the entity system or user device (e.g., application 27, or the like), or may remotely access a backend distributed register application 17 via a web portal, API interface, or the like. The resource account data may comprise information regarding resources within an account belonging to a user. The system and assessments performed on or data logged by the system may be performed across various metrics previously described with regard to FIG. 4. Thus, in an exemplary embodiment, the resource account data may comprise various resource account data (e.g., temporal data, account ownership data, resource amounts, geographic location, or the like).

The process continues to block 501, where the system receives a request to enroll one or more resource accounts in a pooled time deposit resource account. In some embodiments, this may include creating one or more component time deposit accounts wherein the pooled time deposit resource account comprises the one or more component time deposit resource accounts. In this way, the aggregated resource amount of the component resource accounts can be leveraged by use of the pooled time deposit resource account.

In some embodiments, a user may submit resource account data in the course of creation of a new pooled time deposit resource account via an enrollment process. For example, a user may utilize application 27 in order to create a new pooled time deposit resource account, and may share the account information with the resource account system at that time, or the system itself may generate the time deposit account information. The enrollment process may include linking other resource accounts owned by the user which may or may not be managed by the entity in control of the resource account systems, such that the user may fund a component time deposit resource account via one or more resource transfer channels (e.g., direct deposit, automated clearinghouse transfer, real time payment transfer, peer to peer payment transfer, various electronic currency transfers, wire transfers, and the like). In any embodiment, the data generated or received by the resource account systems regarding resource accounts may be submitted as a proposed record for validation to the distributed register, such that the data can be validated and stored in the distributed register for later reference. It is understood that the pooled time deposit resource account may contain pooled resources from one or more disparate ownerships. For instance, resources may be pooled from one or more users' resource accounts in order to maximize gained interest in a pooled time deposit resource account, while the system maintains a validated record of each component time deposit resource account and the interest associated with each component time deposit resource account.

As shown in block 502, the system submits, using a consensus algorithm, a proposed data record for the pooled time deposit account. The system may use one or several consensus algorithms in the various embodiments. For instance, the system may use a Practical Byzantine Fault Tolerance (PBFT) algorithm, through which each distributed register node performs a number of validation checks on the proposed data record (e.g., whether the required assessment parameters have been addressed by the correct assessment parameter inputs, whether the assessment parameters reference a valid resource, whether an resource referenced by an assessment parameter is currently in use by the entity, whether assessment parameter inputs reference a valid assessment parameter, or the like). Based on performing the validation checks, each node may submit an attestation to the other nodes in the distributed register network, where the attestation is an approval or rejection of the proposed data record's validity. The PBFT algorithm may require that a threshold number of attestations (e.g., at least two-thirds of nodes attest "yes") in favor of approving the proposed data record are received by the nodes before the proposed data is added to the distributed register. In this way, even if specific nodes in the distributed register network become offline or unavailable (e.g., network disruptions, hardware failures, data corruption, or the like), the functionality of the distributed register may still be preserved.

In other embodiments, the consensus algorithm may be a PoW algorithm in which the nodes may continually perform computations to resolve a cryptographic puzzle set by the system (e.g., "mining"). Typically, a PoW algorithm may be employed by the system when the distributed register is a public distributed register wherein any member of the public may host a node and participate in consensus. In this way, the system may validate proposed data records even when the "trust levels" amongst the consensus participants are relatively low.

The system may detect, via a distributed register interjector, that the resource account data requires an update. In some embodiments, an interjector may detect the occurrence of an event or condition that triggers the need for updated resource account data. For example, the interjector may detect that a condition precedent of a smart contract has been met, and determine that the specific resource amount for a resource account has changed such that the data within the distributed register no longer reflects the current state of reality. For instance, the terms of a time deposit account agreement may state that interest is compounded at a set rate (e.g., quarterly, monthly, weekly, yearly, or the like). The interjector may recognize that this condition precedent has been met, and may trigger the updating of the distributed register data to reflect the terms of the smart contract, the terms of which may be stored on the distributed register itself as assessment data or tracking data associated with a particular resource account. In other embodiments, an interjector may detect that a new policy or regulation has been placed into effect that necessitates a new or updated assessment parameter. In another embodiment, the interjector may receive periodic updates from an entity system, user device, or auxiliary user device that reflects market data in real time, over a specific frequency (e.g., updated data sent every day, every week, or the like), or in response to a request by the resource account system for an entity, user device, resource, or auxiliary user device to provide updated assessment data. In yet other embodiments, the interjector may detect that a new security vulnerability has been found (e.g., by retrieving data from a threat database or manufacturer regarding a security threat, safety recall, or vulnerability concern as to a component of the resource) and determine that a new assessment parameter should be defined based on the new threat.

In some embodiments, the interjectors may be stored as a separate application which monitors the assessment data within the distributed register and/or pull data from internal or external databases to detect the condition (e.g., a database of rules or policies, applications currently in use at an entity, or the like). In other embodiments, the interjectors may be executed as smart contracts. In embodiments in which the interjectors are executed as smart contracts, the interjectors may be configured to automatically trigger the addition of new assessment data upon the detection of a condition precedent (e.g., an updated rule or regulation, a new security threat, change in account ownership, or the like).

It should be noted that because account data or resource assessment data is validated by the consensus algorithm before being added to the distributed register, the latest information within the data records of the distributed register may be considered to be valid until the interjector triggers the addition of data records to the distributed register. In other words, the distributed register may serve as the single source of truth for users within the entity system. In this way, the distributed register eliminates the occurrence of duplicative assessments and/or improperly performed assessments. Furthermore, the targeted nature of assessments triggered by interjectors (e.g., interjectors address specific areas that need to be updated) greatly increases the efficiency of the assessments performed on the applications in the entity system.

The process continues to block 503, where the system, based on detecting that the resource tracking data requires the update, trigger the resource account system to append additional resource tracking data. In some embodiments, the additional resource tracking data may be entered manually by a user within the entity system. In such embodiments, triggering the resource account system may comprise automatically transmitting a notification to the resource account system, where the notification informs the user that the additional resource tracking data is required. In some embodiments, the notification may be a message sent via SMS, E-mail, instant messaging, or the like. In such embodiments, the notification may comprise a selectable object (e.g., a button, hyperlink, or the like) which, when selected by the user via the resource account system, activates an application on the resource account system (e.g., an entity-provided application, a third party program such as a web browser, or the like) which provides a graphical interface to the user. In other embodiments, the notification may be provided through a notification window within the graphical interface.

Through the graphical interface, the user may submit account data inputs for one or more parameters for a given resource account. In such embodiments, the graphical interface may display the various account parameters for each account belonging to the user. Each account parameter may be associated with an input field to receive input data from the user, where the input field may be a clickable button, radio button, check box, text entry field, or the like. The user may, through the graphical interface, provide input data (e.g., "yes" or "no") to the input field associated with said account parameter. In addition, the same graphical interface may be used to push alerts or reports to the user regarding identified patterns, events, or status updates regarding the account.

The process continues to block 504, where the system may access the distributed register and identify the one or more resource accounts, or component time deposit resource accounts, enrolled in the pooled time deposit resource account. By virtue of the validated data records on the distributed register, the system may utilize account assessment data stored on the distributed register to calculate an account specific accrued interest value for each of the one or more resource accounts enrolled in the pooled time deposit resource account, as shown in block 505.

FIG. 6 is block diagram illustrating the data structures for a resource account service data flow, in accordance with some embodiments of the present disclosure. As shown, the diagram in FIG. 6 provides a use case wherein entity systems 1, 2, N, and the like are client side systems 601, and these systems interface with the institution side systems 602. It is understood that while the embodiment shown involves entity systems, the client sides systems 602 may also involve a number of other systems or user devices, such as user device 120. In the case depicted in FIG. 6, the entire system may be designed such that one or more users or entities may leverage the capabilities of the distributed register system to access resource account services and systems via a streamlined process flow, wherein the capabilities provided by the resource account systems 110 may be provided as a client service.

As shown, the client side systems 601 may interface with the resource account system 110 through a time deposit node 640. In this way, the submission of data from client side systems 602 may be received at the time deposit node 640 and immediately processed for submission to the distributed register of resource account systems 110, such that that data hops or manual data touchpoints are reduced to preferably zero, allowing the system to maintain maximum integrity of data validation. The automated flow of permissioned ledger data allows the leveraging of distributed register technology and distributed register based services directly to client side systems 602. The resource account system 110 may be designed to provide a catalog of services via the time deposit node 640 to the client side systems 601. For instance, the service catalog may comprise user relationship management services, resource planning services, product lifecycle management services, and entity relationship management services, which are able to be accessed by client side systems 601 to store, and retrieve data from a permissioned distributed register system via time deposit node 640.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the entries of a flowchart may, in some embodiments, be in performed in an order other that the order illustrated, may be combined or divided, or may be performed simultaneously. It will also be understood that the entries of the block diagrams illustrated, in some embodiments, merely conceptual delineations between systems and one or more of the systems illustrated by an entry in the block diagrams may be combined or share hardware and/or software with another one or more of the systems illustrated by an entry in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing resource account data in a distributed register, comprising:
   one or more computing platforms where each computing platform comprises
      a processor;
      a communication interface; and
      a memory comprising non-transitory computer readable medium with executable code stored thereon,
      wherein executable code stored in a memory of one of the one or more computing platforms, when executed by the processor of said computing platform, causes the processor to:
         receive resource account data for one or more resource accounts from one or more entities or one or more user devices;
         enroll the one or more resource accounts in a pooled time deposit resource account;
         submit a proposed data record for the pooled time deposit account via a distributed register interjector; and
         append the proposed data record to an entry in a distributed register,
      wherein executable code stored in a memory of one of the one or more computing platforms, when executed by the processor of said computing platform, causes the processor to:
         access the distributed register and identify the one or more resource accounts enrolled in the pooled time deposit resource account; and
         calculate an accrued interest value for one or more of the one or more resource accounts enrolled in the pooled time deposit resource account,
      wherein executable code stored in a memory of one of the one or more computing platforms, when executed by the processor of said computing platform, causes the processor to:
         detect a change in a policy affecting the pooled time deposit resource account, wherein the change in the policy requires additional information to be added to the pooled time deposit resource account to maintain compliance with the policy; and in response to thereto, automatically trigger the resource account system to submit a second proposed data record, the second proposed data record comprising additional resource account data associated with the change in the policy.

2. The system of claim 1, wherein accrued interest for the pooled time deposit resource account is greater than accrued interest available for each of the one or more resource accounts individually.

3. The system of claim 1, wherein the resource account data is received at a node of the distributed register.

4. The system of claim 1, wherein the system is further configured to transmit a request for authorization to access a user's resource accounts in response to receiving a request to enroll one or more resource accounts in a pooled time deposit resource account.

5. The system of claim 1, wherein the pooled time deposit resource account further comprises one or more component time deposit resource accounts.

6. The system of claim 5, wherein enrolling the one or more resource accounts in the pooled time deposit resource account further comprises transferring resources from the one or more resource accounts to one or more component time deposit resource accounts.

7. The system of claim 1, wherein submitting a proposed data record for the pooled time deposit account via a distributed register interjector is based on a consensus algorithm.

8. A computer program product for managing resource account data in a distributed register, the computer program product comprising at least one non-transitory computer readable medium having computer-readable program code portions embodied therein, the computer-readable program code portions comprising:
   an executable portion for receiving resource account data for one or more resource accounts from one or more entities or one or more user devices;
   an executable portion for enrolling the one or more resource accounts in a pooled time deposit resource account;
   an executable portion for submitting a proposed data record for the pooled time deposit account via a distributed register interjector;
   an executable portion for appending the proposed data record to an entry in a distributed register;
   an executable portion for accessing the distributed register and identify the one or more resource accounts enrolled in the pooled time deposit resource account;
   an executable portion for calculating an accrued interest value for one or more of the one or more resource accounts enrolled in the pooled time deposit resource account;
   an executable portion for detecting a change in a policy affecting the pooled time deposit resource account, wherein the change in the policy requires additional information to be added to the pooled time deposit resource account to maintain compliance with the policy; and
   an executable portion for, in response to thereto, automatically triggering the resource account system to submit a second proposed data record, the second proposed data record comprising additional resource account data associated with the change in the policy.

9. The computer program product of claim 8, wherein accrued interest for the pooled time deposit resource account is greater than accrued interest available for each of the one or more resource accounts individually.

10. The computer program product of claim 8, wherein the resource account data is received at a node of the distributed register.

11. The computer program product of claim 8, wherein the system is further configured to transmit a request for authorization to access a user's resource accounts in response to receiving a request to enroll one or more resource accounts in a pooled time deposit resource account.

12. The computer program product of claim 8, wherein the pooled time deposit resource account further comprises one or more component time deposit resource accounts.

13. The computer program product of claim 12, wherein enrolling the one or more resource accounts in the pooled time deposit resource account further comprises transferring resources from the one or more resource accounts to one or more component time deposit resource accounts.

14. A computer-implemented method for managing resource tracking data in a distributed register, the method comprising:
   receiving resource account data for one or more resource accounts from one or more entities or one or more user devices;
   enrolling the one or more resource accounts in a pooled time deposit resource account;
   submitting a proposed data record for the pooled time deposit account via a distributed register interjector;
   appending the proposed data record to an entry in a distributed register;
   accessing the distributed register and identify the one or more resource accounts enrolled in the pooled time deposit resource account;
   calculating an account specific accrued interest value for one or more of the one or more resource accounts enrolled in the pooled time deposit resource account;
   detecting a change in a policy affecting the pooled time deposit resource account, wherein the change in the policy requires additional information to be added to the pooled time deposit resource account to maintain compliance with the policy; and
   in response to the change in the policy, automatically triggering the resource account system to submit a second proposed data record, the second proposed data record comprising additional resource account data associated with the change in the policy.

15. The computer-implemented method of claim 14, wherein accrued interest for the pooled time deposit resource account is greater than accrued interest available for each of the one or more resource accounts individually.

16. The computer-implemented method of claim 14, wherein the resource account data is received at a node of the distributed register.

17. The computer-implemented method of claim 14, wherein the system is further configured to transmit a request for authorization to access a user's resource accounts in response to receiving a request to enroll one or more resource accounts in a pooled time deposit resource account.

18. The computer-implemented method of claim 14, wherein the pooled time deposit resource account further comprises one or more component time deposit resource accounts.

19. The computer-implemented method of claim 15, wherein enrolling the one or more resource accounts in the pooled time deposit resource account further comprises transferring resources from the one or more resource accounts to one or more component time deposit resource accounts.

20. The computer implemented method of claim 14, wherein submitting a proposed data record for the pooled time deposit account via a distributed register interjector is based on a consensus algorithm.

* * * * *